US012789721B2

(12) United States Patent
Nagao et al.

(10) Patent No.: US 12,789,721 B2
(45) Date of Patent: Nov. 10, 2026

(54) INTERIOR COMPONENT OF VEHICLE

(71) Applicants: TOYOTA JIDOSHA KABUSHIKI KAISHA, Toyota (JP); INOAC CORPORATION, Nagoya (JP)

(72) Inventors: Takashi Nagao, Miyoshi (JP); Tohru Sugiura, Nishio (JP)

(73) Assignees: TOYOTA JIDOSHA KABUSHIKI KAISHA, Toyota (JP); INOAC CORPORATION, Nagoya (JP)

( * ) Notice: Subject to any disclaimer, the term of this patent is extended or adjusted under 35 U.S.C. 154(b) by 262 days.

(21) Appl. No.: 18/747,215

(22) Filed: Jun. 18, 2024

(65) Prior Publication Data

US 2025/0033576 A1 Jan. 30, 2025

(30) Foreign Application Priority Data

Jul. 26, 2023 (JP) ................................. 2023-121742

(51) Int. Cl.
*B60R 13/02* (2006.01)

(52) U.S. Cl.
CPC ................................ *B60R 13/0256* (2013.01)

(58) Field of Classification Search
CPC . B60R 13/02; B60R 13/0256; B60R 13/0262; B60R 13/0268
USPC ......................................................... 296/1.08
See application file for complete search history.

(56) References Cited

U.S. PATENT DOCUMENTS

2007/0278809 A1* 12/2007 Reed .................. B29C 67/0044
296/146.7
2024/0220030 A1* 7/2024 Okumura ............... H03K 17/98

FOREIGN PATENT DOCUMENTS

| | | | | |
|---|---|---|---|---|
| CH | 693140 A5 * | 3/2003 | ......... B29C 45/0055 |
| EP | 2722230 A1 * | 4/2014 | ............. B60R 13/02 |
| JP | H081777 A * | 1/1996 | |
| JP | 2017-114261 A | 6/2017 | |
| WO | WO-2025137099 A1 * | 6/2025 | ....... B29C 45/14778 |

OTHER PUBLICATIONS

Shimizu et al. (JP H081777 A) (Year: 1996).*

* cited by examiner

*Primary Examiner* — Wenwei Zhuo
(74) *Attorney, Agent, or Firm* — Finnegan, Henderson, Farabow, Garrett and Dunner, LLP

(57) ABSTRACT

An interior component of a vehicle includes: a base member; and a skin member that covers at least a part of the base member, in which a rib is provided on a back surface of a terminal of the base member and a terminal portion of the skin member is wrapped to the back surface of the base member, and is welded to the base member so as to contain the rib.

3 Claims, 4 Drawing Sheets

INTERIOR COMPONENT OF VEHICLE

CROSS-REFERENCE TO RELATED APPLICATION

This application claims priority to Japanese Patent Application No. 2023-121742 filed on Jul. 26, 2023, incorporated herein by reference in its entirety.

BACKGROUND

1. Technical Field

The present disclosure relates to an interior component of a vehicle.

2. Description of Related Art

In an interior component of a vehicle, a front surface of a base member is covered with a skin member. Conventionally, technologies in relation to a method for forming the skin member or a method for holding the skin member on the base member have been proposed for improving the design quality of the interior component or more securely welding between the base member and the skin member.

For example, Japanese Unexamined Patent Application Publication No. 2017-114261 discloses an interior member including: a base member that includes a body portion, a flange portion, and a support rib; and a skin body that covers the base member and is fixed to the base member. In the interior member, a terminal portion of the skin body wrapped around the flange portion is pushed along a guide portion that projects inward of the flange portion, and thereby the terminal portion is sandwiched between the support rib and the flange portion while being guided by the guide portion. As a result, it is possible to hold the terminal portion of the skin body on the base member easily and securely.

SUMMARY

In the related art, at a terminal portion of the interior component of the vehicle, the skin member is folded and is inserted under the back surface of the base member. On this occasion, in the case where the terminal of the base member has an acute shape, tearing or whitening sometimes occurs at a portion of the skin member that contacts with the terminal of the base member. Therefore, as the shape of the terminal, a rounded corner having a large corner radius (that is, an obtuse shape in which the curve of the corner is large) is adopted instead of an acute shape. However, from a standpoint of the design, it is occasionally desirable to adopt a more acute shape for the terminal of the interior component.

Hence, the present specification provides an interior component of a vehicle that allows the tearing and whitening of the skin member not to occur at the terminal portion of the skin member that covers the base member, even when the terminal of the base member has an acute shape.

An interior component of a vehicle that is disclosed in the present specification includes: a base member; and a skin member that covers at least a part of the base member, in which a rib is provided on a back surface of a terminal of the base member, and a terminal portion of the skin member is wrapped to the back surface of the base member, and is welded to the base member so as to contain the rib.

In the above configuration, even when the terminal of the base member has an acute shape, the terminal portion of the skin member is wrapped to the back surface of the base member, and is welded to the rib, and therefore, the terminal portion of the skin member does not need to be folded. As a result, it is possible to prevent the occurrence of the tearing and whitening at the portion of the skin member that contacts with the terminal of the base member.

Also, in the interior component of the vehicle, a side wall of the rib may be disposed at a position that is away from a periphery of the terminal of the base member.

Further, in the interior component of the vehicle, the base member may have a tapered shape toward the terminal, and the rib may be disposed roughly at a center in a direction orthogonal to a direction toward a distal end of the tapered shape.

In the above configuration, it is possible to cause a design line of the interior component to appear, and to avoid the terminal portion of the skin member wrapped to the back surface of the base member from appearing on a design surface.

The interior component of the vehicle that is disclosed in the present specification allows the terminal of the base member to have an acute shape and allows the tearing and whitening of the skin member not to occur at the terminal portion of the skin member that covers the base member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An interior component of a vehicle will be described below with reference to the drawings. In the figures, "Fr", "Up", and "Rh" indicate a vehicle forward direction, a vehicle upward direction, and a vehicle rightward direction, respectively.

Figure 1:
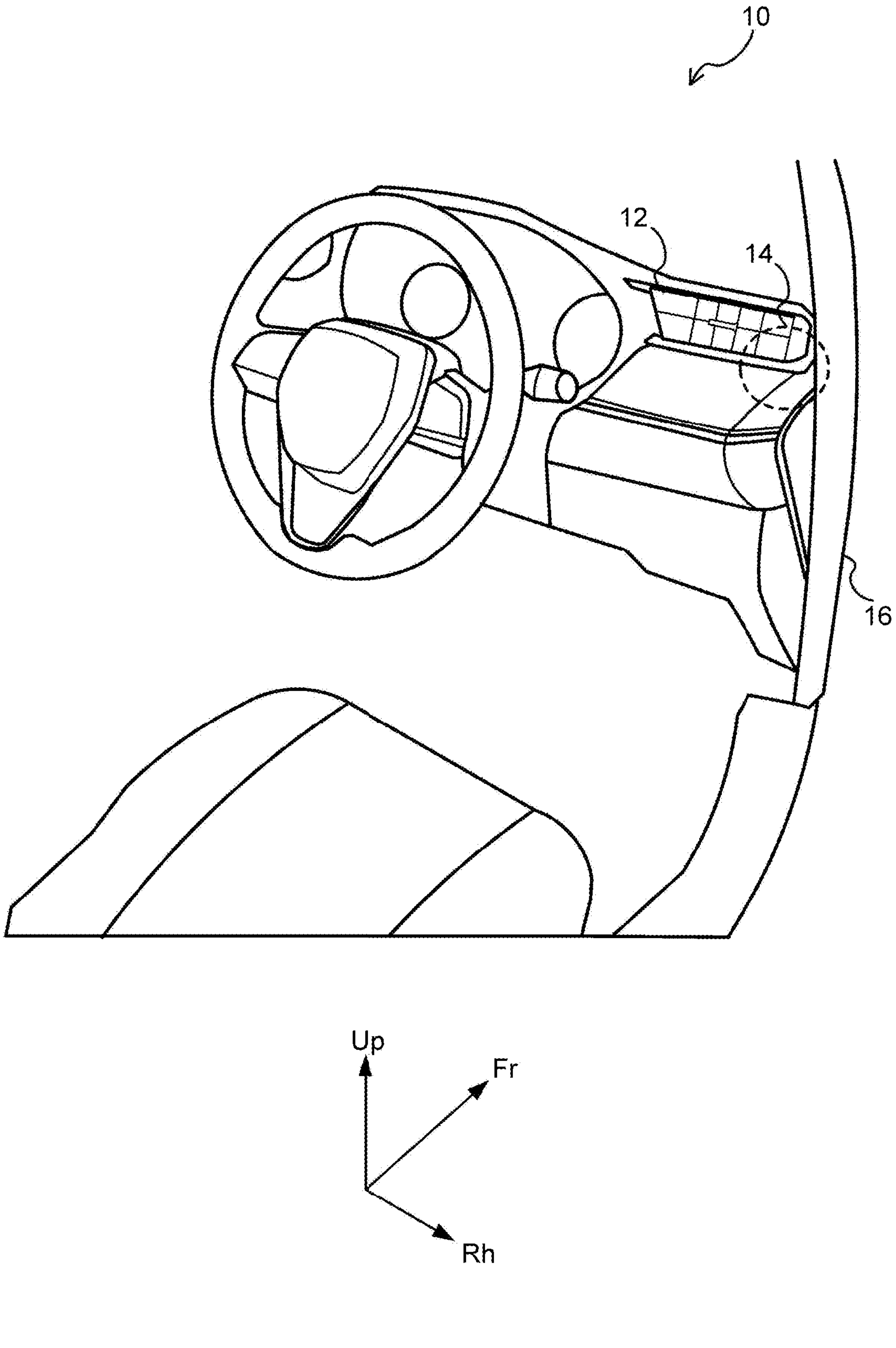
FIG. 1 is a schematic view of a vehicle interior in which an interior component is provided.

FIG. 1 is a schematic diagram of a vehicle interior in which an interior component is provided. As shown in FIG. 1, an outlet 12 of an air conditioner is provided at a vehicle-width-directional right end of an instrument panel of a vehicle 10. Further, an interior component 14 is disposed just under the outlet 12 of the air conditioner. More specifically, the interior component 14 of the vehicle 10 is positioned on a reverse surface of the outlet 12 of the air conditioner, and an end surface on the outside in the vehicle-width direction is provided at a spot that faces a vehicle body side portion 16 constituted by a door, a front pillar, and the like. In FIG. 1, the interior component 14 is shown so as to be enclosed by a broken line.

In the embodiment, the "base member" in the claims is a body portion of the interior component 14. However, the interior component of the vehicle that is disclosed in the present specification is not limited to this. In this embodiment, as an example of the base member, a member that is provided just under the outlet of the air conditioner as shown in FIG. 1 is exemplified. However, the base member may be another decorative component on the instrument panel, or may be a lid body of a console box, for example. That is, the base member in the claims can be applied to various interior components in the vehicle.

Figure 2:
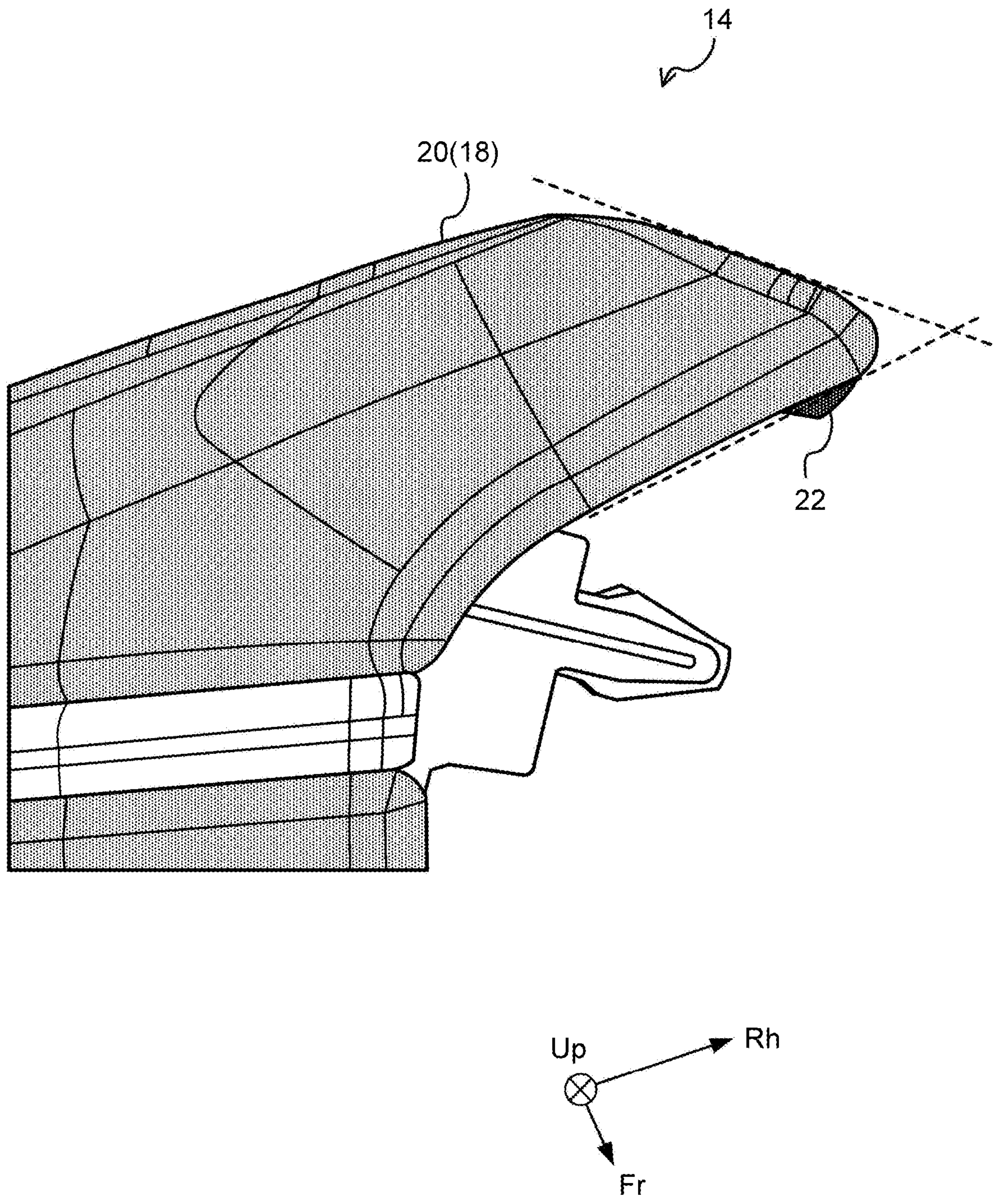
FIG. 2 is a schematic perspective view of the interior component of the vehicle as viewed from a vehicle lower side.
Figure 3:
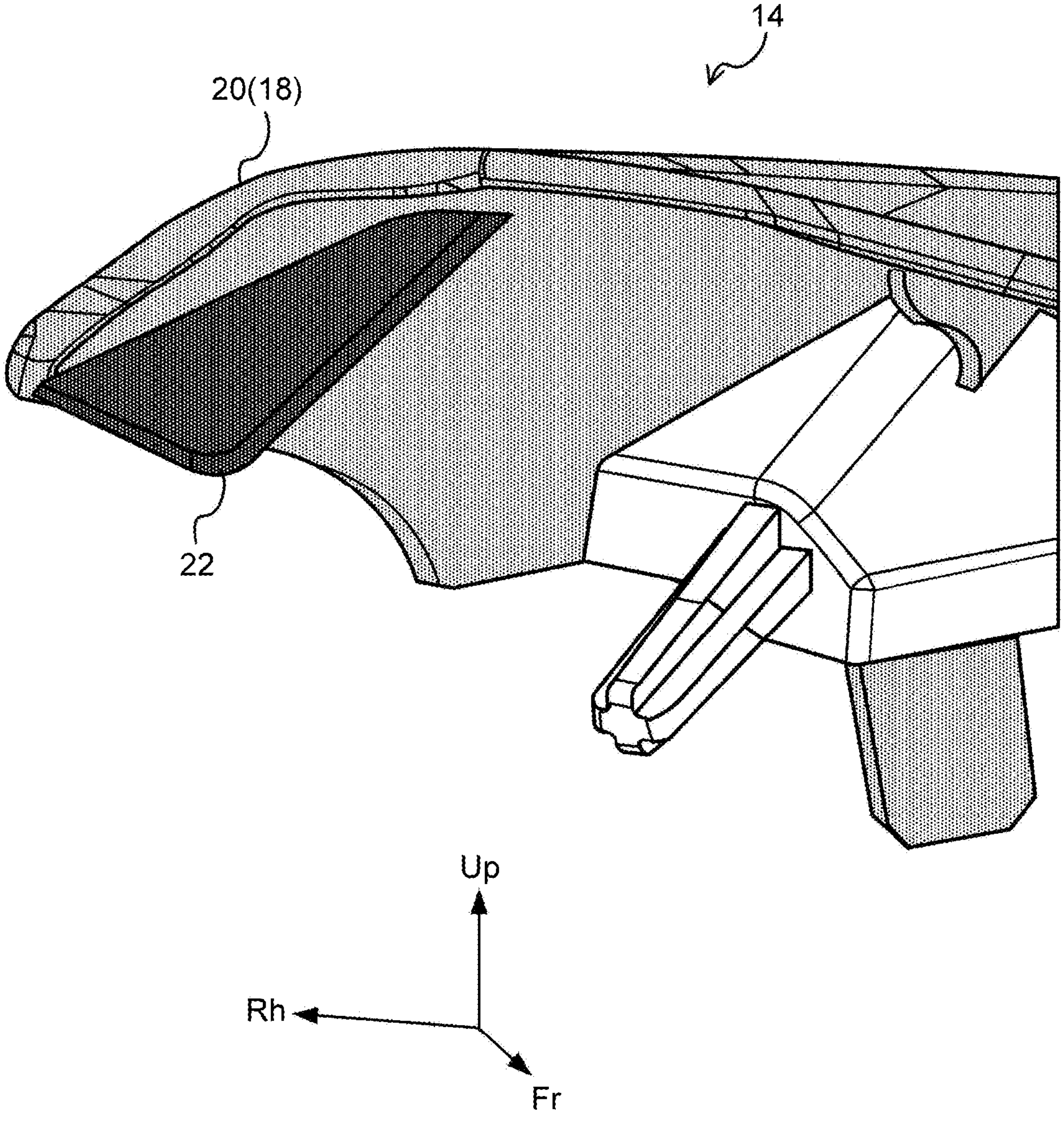
FIG. 3 is a schematic perspective view showing a back surface of the interior component of the vehicle.

Next, the interior component 14 will be further described with use of FIG. 2 and FIG. 3. FIG. 2 is a schematic perspective view of the interior component of the vehicle as viewed from a vehicle lower side. Further, FIG. 3 is a schematic perspective view showing a back surface of the interior component of the vehicle. As shown in FIG. 2 and FIG. 3, the interior component 14 of the vehicle 10 includes a base member 18 and a skin member 20. In the embodiment, the base member 18 is a member that is provided just under the outlet 12 of the air conditioner. The skin member 20 is a member that covers at least a part of the base member 18. The materials of the base member 18 and the skin member 20 are not particularly limited, and only need to allow the skin member 20 to be welded to the surface of the base member 18. In FIG. 2 and FIG. 3, the reference numeral of the base member 18 is shown in parentheses, because the base member 18 is covered with the skin member 20. Further, the skin member 20 is shown as light gray portions.

Figure 4:
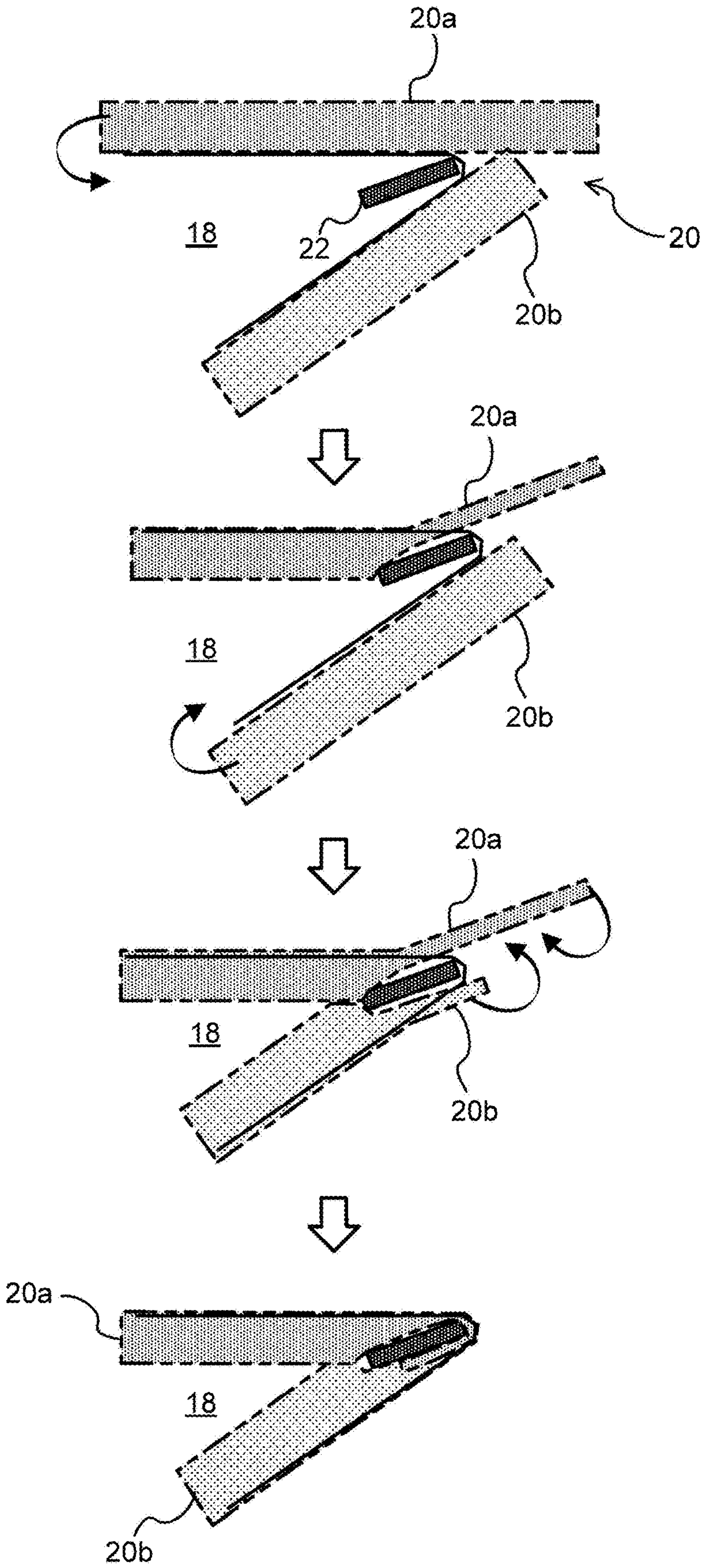
FIG. 4 is a diagram showing a manner in which a skin member is welded to a rib.

As shown in FIG. 2 and FIG. 3, a rib 22 is provided on a back surface of a terminal of the base member 18. In the embodiment, the rib 22 is formed integrally with the base member 18. The rib 22 is a reinforcing member that extends perpendicularly to a front surface (that is, a design surface) of the base member 18. In FIG. 2 to FIG. 4, the rib 22 is shown as dark gray portions.

As shown in FIG. 2, in the interior component of the vehicle that is disclosed in the present specification, an acute shape is realized at the terminal of the base member 18 covered with the skin member 20. In FIG. 2, extended lines of two sides that are adjacent on the outline of the base member 18 are shown by broken lines. That is, the broken lines shown in FIG. 2 express that the angle at which the broken lines cross is an acute angle, in other words, that the terminal of the base member 18 has an acute shape.

When the terminal of the base member 18 has an acute shape as described above, the rib 22 is necessary for welding the skin member 20 to the surface of the base member 18. The rib 22 in the embodiment extends toward the acute terminal. This configuration will be further described with use of FIG. 4.

FIG. 4 is a diagram showing a manner in which the skin member is welded to the rib. In FIG. 4, the back surface of the base member 18 is shown. In FIG. 4, overlap width portions that are at the terminal portion of the skin member 20 and that are welded to the back surface of the base member 18 are shown as welding widths 20*a*, 20*b*. Further, the skin member 20 and the welding widths 20*a*, 20*b* that are parts of the skin member 20 are shown in light gray and furthermore are enclosed by two-dot chain lines, for discriminating borders with other members. The welding width 20*b* is shown in a lighter color than the welding width 20*a*.

Conventionally, in the interior component of the vehicle, for securing the design quality, the front surface of the base member is covered with the skin member, and the terminal of the skin member is wrapped to the back surface side of the base member. In the embodiment, the front surface of the base member 18 is covered with the skin member 20, and the terminal portion of the skin member 20 is wrapped to the back surface of the base member 18. Moreover, the terminal portion of the skin member 20 wrapped to the back surface is welded to the base member 18 so as to contain the rib 22. FIG. 4 shows processes for the welding, in order from the top.

The uppermost diagram in FIG. 4 is a diagram showing a state where the skin member 20 is coupled to the base member 18 (that is, a state where the skin member 20 covers the front surface of the base member 18). This diagram shows a state before the welding widths 20*a*, 20*b* are wrapped to the back surface of the base member 18. The second diagram from the top in FIG. 4 is a diagram showing a state where the welding width 20*a* is wrapped to the back surface of the base member 18 and is welded. The third diagram from the top in FIG. 4 is a diagram showing a state where the welding width 20*b* is wrapped to the back surface of the base member 18 and is welded. As can be seen from this diagram, end portions of the skin member 20 are in excess, at the vicinity of a distal end portion of the base member 18. That is, the welding widths 20*a*, 20*b* have excess skin portions. In the case where the rib 22 is not provided on the base member 18, the excess skin portions at the end of the skin member 20 are folded and are inserted under the back surface of the base member 18. However, in that case, a space for inserting the excess skin portions is sometimes additionally needed on the back surface of the base member 18. Further, in the case where the distal end portion of the base member 18 has a tapered shape as in the case of the embodiment, that is, in the case where the terminal has an acute shape, force acts on the skin member 20 when the excess skin portions at the end of the skin member 20 are folded, so that tearing and whitening sometimes occur. However, in the embodiment, the rib 22 is provided on the base member 18. Therefore, as shown by two black arrows in the third diagram from the top in FIG. 4, the excess skin portions can be welded to the base member 18 so as to contain the rib 22, without being folded. Next, the lowermost diagram in FIG. 4 is a diagram showing a state where the skin member 20 is welded to the base member 18 so as to contain the rib 22. As can be seen from this diagram, the excess skin portions at the end of the skin member 20 are wrapped around the rib 22 and are welded to a surface of the rib 22.

As described above, although the terminal of the base member 18 has an acute shape, the terminal portion of the skin member 20 is wrapped to the back surface of the base member 18, and is welded to the rib 22. In other words, the skin at the terminal portion of the skin member 20 can be inserted along the rib 22. Accordingly, it is not necessary to fold the terminal portion of the skin member 20. As a result, it is possible to prevent the occurrence of the tearing and whitening at the portion of the skin member 20 that contacts with the terminal of the base member 18.

Further, as shown in FIG. 4, a side wall of the rib 22 is disposed at a position that is away from the periphery of the terminal of the base member 18. The base member 18 has a tapered shape toward the terminal, and the rib 22 is disposed roughly at a center in a direction orthogonal to a direction toward the distal end of the tapered shape. For example, in the case where the rib 22 is along one side of the base member 18 (that is, in the case of a shape that is elongated from a side surface of the base member 18), a skin portion of the skin member 20 after terminal treatment is sometimes seen from the gap between a component and a component. However, from a standpoint of the design, it is necessary to avoid an excess spot of the skin member 20 wrapped to the back surface of the base member 18 from being seen from the design surface. Therefore, the side wall of the rib 22 is disposed at the position that is away from the periphery of the terminal of the base member 18 (for example, roughly at the center between two adjacent sides on the outline of the base member 18, as shown in FIG. 4).

The above description is an example. The interior component of the vehicle that is disclosed in the present specification only needs to have a configuration in which the terminal portion of the skin member is wrapped to the back surface of the base member and is welded to the base member so as to include the rib. Accordingly, the other configuration of the interior component of the vehicle may be altered when appropriate.

For example, the shape of the rib 22 is shown as a triangular shape in the embodiment, but is not limited to this. The rib 22 only needs to allow the excess portion at the end of the skin member 20 to be wrapped. That is, the rib 22 only needs to have an area that allows the excess skin at the end of the skin member 20 to be welded, and therefore the shape of the rib 22 is not particularly limited. Accordingly, instead of a triangular shape, the shape of the rib 22 may be a rectangular bar shape in which the cross-section has a long axis and a short axis, for example.

What is claimed is:

1. An interior component of a vehicle, the interior component comprising:

a base member having a terminal with an acute shape; and a skin member that covers at least a part of the base member, wherein a rib is provided on a back surface of the terminal of the base member, and a terminal portion of the skin member is wrapped to the back surface of the base member, and is welded to a surface of the rib so as to contain the rib.

2. The interior component of the vehicle according to claim 1, wherein a side wall of the rib is disposed at a position that is away from a periphery of the terminal of the base member.

3. The interior component of the vehicle according to claim 2, wherein:

the base member has a tapered shape toward the terminal; and the rib is disposed roughly at a center in a direction orthogonal to a direction along the tapered shape toward the distal end of the base member.

* * * * *